US012216422B2

(12) United States Patent
Endo

(10) Patent No.: US 12,216,422 B2
(45) Date of Patent: Feb. 4, 2025

(54) FIXING DEVICE

(71) Applicant: Toshiba Tec Kabushiki Kaisha, Tokyo (JP)

(72) Inventor: Sasuke Endo, Chigasaki Kanagawa (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/159,564

(22) Filed: Jan. 25, 2023

(65) Prior Publication Data

US 2023/0393505 A1 Dec. 7, 2023

(30) Foreign Application Priority Data

Jun. 1, 2022 (JP) ................................ 2022-089684

(51) Int. Cl.
*G03G 15/20* (2006.01)

(52) U.S. Cl.
CPC ................................ *G03G 15/2053* (2013.01)

(58) Field of Classification Search
CPC ............. G03G 15/2053; G03G 15/206; G03G 15/2064; G03G 15/6555; G03G 2215/2035
See application file for complete search history.

(56) References Cited

U.S. PATENT DOCUMENTS 8,600,277 B2 12/2013 Yoshikawa
10,935,912 B1 * 3/2021 Yokoyama ......... G03G 15/2053
11,340,545 B1 5/2022 Miyashita
2012/0263510 A1 10/2012 Mita
2017/0102651 A1 4/2017 Tanaka
2020/0133179 A1 * 4/2020 Fukamachi ........ G03G 15/2017
2022/0035286 A1 2/2022 Saeki

FOREIGN PATENT DOCUMENTS

EP 2369427 A2 9/2011
JP H11260533 A 9/1999
JP 2017049618 A 3/2017
JP 2017072781 A 4/2017

OTHER PUBLICATIONS

Extended European Search Report dated Oct. 18, 2023, mailed in counterpart European Application No. 23162739.9, 8 pages.

* cited by examiner

*Primary Examiner* — Hoang X Ngo
(74) *Attorney, Agent, or Firm* — Kim & Stewart LLP

(57) ABSTRACT

According to one embodiment, a fixing device includes a cylindrical fixing body, a heater unit, and a heat transfer member. The heater unit is in an interior region surrounded by the cylindrical fixing body and includes a heating element group. The heater unit extends lengthwise in a first direction parallel to an axial direction of the cylindrical fixing. The heat transfer member has a contact surface that contacts heater unit and an opposite surface on a side opposite the heater unit. The outer edges of the opposite surface in the first direction are at positions along the first direction that are beyond the outer edges of the contact surface in the first direction.

18 Claims, 8 Drawing Sheets

FIXING DEVICE

CROSS-REFERENCE TO RELATED APPLICATION

This application is based upon and claims the benefit of priority from Japanese Patent Application No. 2022-089684, filed Jun. 1, 2022, the entire contents of which are incorporated herein by reference.

FIELD

Embodiments described herein relate generally to a fixing device for an image forming apparatus or the like.

BACKGROUND

An image forming apparatus (also referred to as an image processing apparatus) includes a fixing device that heats toner (or other recording agent) to fix the toner to a sheet. The fixing device includes a cylindrical body that rotates while coming into contact with the sheet and a heater unit that heats the cylindrical body. The heater unit is required to provide a highly uniform temperature distribution and prevent irregularities in the temperature distribution from occurring.

DETAILED DESCRIPTION

Figure 1:
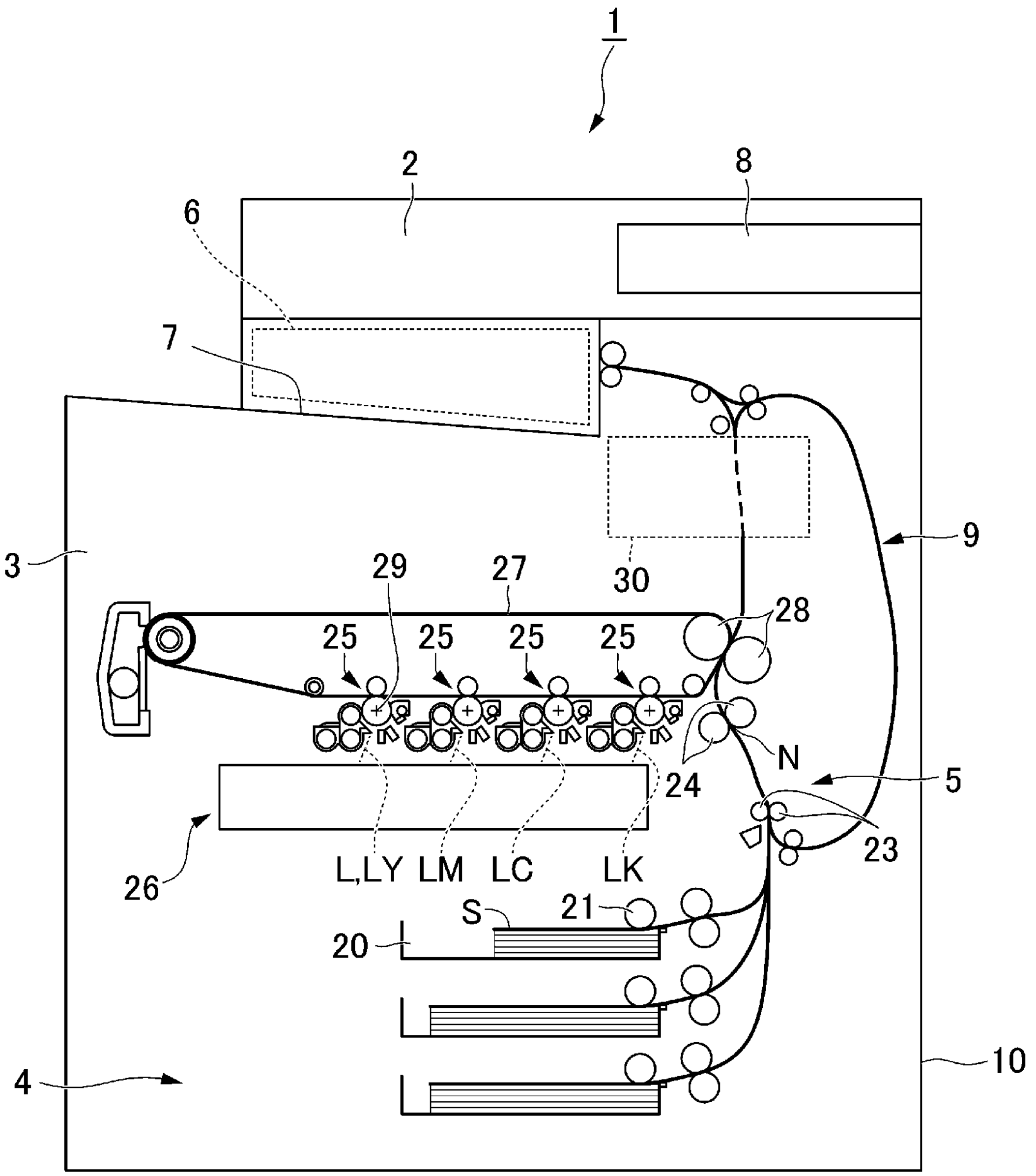
FIG. 1 is a diagram of an image processing apparatus according to an embodiment.

In general, according to one embodiment, a fixing device includes a cylindrical fixing body, a heater unit, and a heat transfer member. The heater unit is in an interior region surrounded by the cylindrical fixing body and includes a heating element group. The heater unit extends lengthwise in a first direction parallel to an axial direction of the cylindrical fixing. The heat transfer member has a contact surface that contacts heater unit and an opposite surface on a side opposite the heater unit. The outer edges of the opposite surface in the first direction are at positions along the first direction that are beyond the outer edges of the contact surface in the first direction.

According to a first aspect, a fixing device includes a cylindrical body, a heater unit, and a heat transfer member. The cylindrical body has a film shape. The heater unit is disposed inside the cylindrical body. In the heater unit, an axial direction of the cylindrical body is defined as a longitudinal direction. The heater unit includes heating element group that includes a heating body which generates heat when supplied with electricity. The heat transfer member includes a contact portion and an opposite surface. The contact portion comes into contact with the heater unit. The opposite surface faces a side opposite to the contact portion. Both ends of the opposite surface in the longitudinal direction are outside of the contact portion in the longitudinal direction. Both ends of the contact portion in the longitudinal direction are in the longitudinal direction inside of both ends of the heating element group in the longitudinal direction.

According to a second aspect, a fixing device includes a cylindrical body, a heater unit, and a heat transfer member. The cylindrical body has a film shape. The heater unit is disposed inside the cylindrical body. In the heater unit, an axial direction of the cylindrical body is defined as a longitudinal direction. The heater unit includes a heating element group that includes a heating body which generates heat when electrified. The heat transfer member includes a heater facing surface and an opposite surface. The heater facing surface faces a side of the heater unit. The opposite surface faces a side opposite to the heater facing surface. The heater facing surface includes a contact portion and an end. The contact portion comes into contact with the heater unit. Both ends of the contact portion in the longitudinal direction are in the longitudinal direction inside of both ends of the heating element group in the longitudinal direction. The end is adjacent to the contact portion on both outsides in the longitudinal direction. A contact area of the end to the heater unit per unit length in the longitudinal direction is smaller than the contact portion.

According to a third aspect, in the fixing device according to the first aspect, an end of the heat transfer member in the longitudinal direction may not be in contact with the heater unit.

According to a fourth aspect, in the fixing device according to any one of the first to third aspects, the both ends of the heat transfer member in the longitudinal direction may be in the longitudinal direction outside of the both ends of the heating element group.

According to a fifth aspect, in the fixing device according to any one of the first to fourth aspects, the heat transfer member may have heat conductivity higher than that of a substrate of the heater unit.

According to a sixth aspect, in the fixing device according to any one of the first to fifth aspects, the heat transfer member may be a single member extending from the contact portion to the opposite surface.

According to a seventh aspect, in the fixing device according to any one of the first to sixth aspects, the heat transfer member may include a first plate which includes the contact portion and a second plate which includes the opposite surface and overlaps with the first plate and of which both ends in the longitudinal direction are in the longitudinal direction outside of both ends of the first plate in the longitudinal direction.

According to an eighth aspect, the fixing device according to any one of the first to seventh aspects may further include a heat insulation member disposed outside of the contact portion in the longitudinal direction and intervenes between the heat transfer member and the heater unit.

According to a ninth aspect, in the fixing device according to the eighth aspect, the heat insulation member may have heat conductivity lower than that of the heat transfer member.

Hereinafter, a fixing device according to certain example embodiments will be described with reference to the drawings. In the following description, the same reference numerals are given to aspects that have the same or substantially similar functions and repeated description of the same configurations or aspects may be omitted in some cases.

FIG. 1 is a diagram illustrating a schematic configuration of an image processing apparatus according to an embodiment.

FIG. 1 depicts image forming apparatus 1, which is a multi-function peripheral (MPF) printer or a copy machine (copier). For example, the image forming apparatus 1 is installed at a work place. The image forming apparatus 1 performs a process of forming an image on a sheet S. The sheet S may be a sheet of paper. The image forming apparatus 1 includes a housing 10, a scanner unit 2, an image forming unit 3, a sheet supply unit 4, a conveyance unit 5, a discharging tray 7, a reversing unit 9, a control panel 8, and a control unit 6.

The housing 10 forms the external shape of the image forming apparatus 1.

The scanner unit 2 reads image information of an object to be copied based on brightness and darkness of light and generates an image signal accordingly. The scanner unit 2 outputs the generated image signal to the image forming unit 3.

The image forming unit 3 forms a toner image based on the image signal received from the scanner unit 2 or an image signal received from the outside (e.g., from an external device). The image forming unit 3 transfers the toner image to a surface of the sheet S. The image forming unit 3 heats and presses the toner image on the sheet S to fix the toner image to the sheet S.

The sheet supply unit 4 supplies the sheets S to the conveyance unit 5 one by one at a timing at which the image forming unit 3 forms the toner image. The sheet supply unit 4 includes a sheet accommodation unit 20 and a pickup roller 21.

The sheet accommodation unit 20 accommodates a type of sheet S with a predetermined size (e.g., a standard paper size).

The pickup roller 21 picks up the sheets S from the sheet accommodation unit 20 one by one. The pickup roller 21 supplies the picked-up sheet S to the conveyance unit 5.

The conveyance unit 5 conveys the sheet S to the image forming unit 3. The conveyance unit 5 includes a conveyance roller 23 and a registration roller 24.

The conveyance roller 23 conveys the sheet S from the pickup roller 21 to the registration roller 24. The conveyance roller 23 causes the leading end of the sheet S in the conveyance direction to be butted against a nip N of the registration roller 24.

The registration roller 24 appropriately positions of the leading end of the sheet S by bending the sheet S at the nip N. The registration roller 24 then conveys the sheet S at a time appropriate for the image forming unit 3 to transfer the toner image to the sheet S.

The image forming unit 3 includes a plurality of image forming units 25, a laser scanning unit 26, an intermediate transfer belt 27, a transfer unit 28, and a fixing device 30.

Each image forming unit 25 includes a photosensitive drum 29. The image forming unit 25 forms the toner image on the photosensitive drum 29 in accordance with the image signal from the scanner unit 2 or the outside. The plurality of image forming units 25 respectively form toner images with toner of a different color (e.g., yellow, magenta, cyan, or black).

A charging unit, a developing unit, and the like are disposed around the photosensitive drum 29. The charging unit charges the surface of the photosensitive drum 29. The developing unit accommodates developer containing the toner of the respective color (yellow, magenta, cyan, or black). The developing unit supplied toner (developer) to an electrostatic latent image formed on the photosensitive drum 29. As a result, a toner image of single color is formed on the photosensitive drum 29.

The laser scanning unit 26 scans laser light L to the charged photosensitive drums 29 to expose the photosensitive drums 29 according to the image signal. The laser scanning unit 26 exposes the photosensitive drums 29 of the image forming units 25 with the corresponding laser light L (laser light LY, laser light LM, laser light LC, and laser light LK). In this way, the laser scanning unit 26 forms electrostatic latent images on each of the photosensitive drums 29.

The toner images on the surfaces of the photosensitive drums 29 are then transferred to the intermediate transfer belt 27 (primary transfer). The transfer unit 28 then transfers (secondary transfer) the toner images from the intermediate transfer belt 27 to the sheet S at a secondary transfer position.

The fixing device 30 heats and presses the toner images on the sheet S to fix the toner images to the sheet S.

The reversing unit 9 reverses the sheet S so an image can be formed on the back surface of the sheet S. The reversing unit 9 reverses the front and back surfaces of the sheet S after discharge from the fixing device 30 by a switchback. The reversing unit 9 then conveys the reversed sheet S to the registration roller 24.

The discharged sheet S on which an image has been formed is placed on the discharging tray 7.

The control panel 8 is an input unit by which an operator can input information (e.g., commands, parameter settings, etc.) for operating the image forming apparatus 1. The control panel 8 includes a touch panel and/or various hard keys (buttons).

The control unit 6 controls each unit of the image forming apparatus 1.

Figure 2:
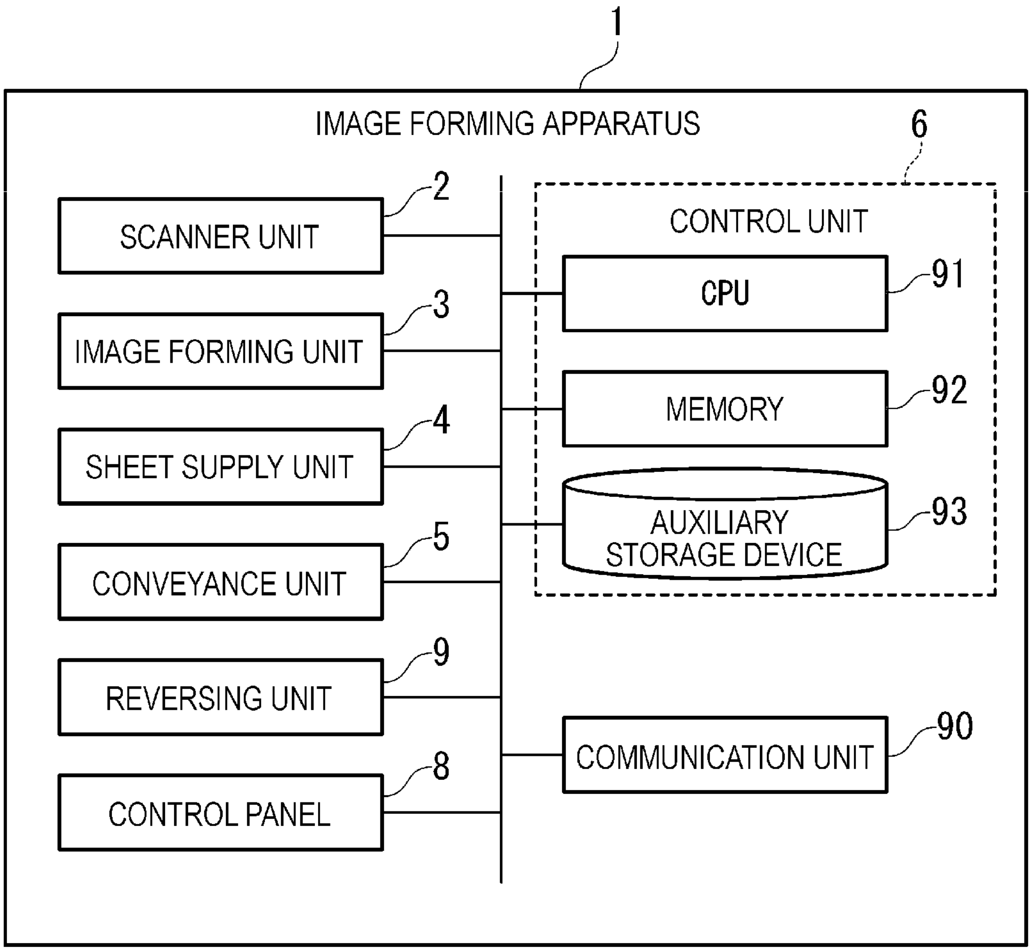
FIG. 2 is a diagram illustrating hardware aspects of an image processing apparatus.

FIG. 2 is a diagram illustrating a hardware configuration of image forming apparatus 1.

As illustrated in FIG. 2, the image forming apparatus 1 includes a central processing unit (CPU) 91, a memory 92, an auxiliary storage device 93 connected via a bus. The CPU 91 executes a program (software) to permit the image forming apparatus 1 to perform various operations and functions. The image forming apparatus 1 includes a scanner unit 2, an image forming unit 3, a sheet supply unit 4, a conveyance unit 5, a reversing unit 9, a control panel 8, and a communication unit 90.

The CPU 91 is a part of the control unit 6 along with the memory 92 and the auxiliary storage unit 93. The memory 92 and the auxiliary storage device 93 may store a program (or programs) which may be executed by the CPU 91. The control unit 6 controls the operations of each unit of the image forming apparatus 1.

The auxiliary storage device 93 can be a magnetic hard disk device or a semiconductor storage device. The auxiliary storage device 93 stores information.

The communication unit 90 provides a communication interface for connecting the image forming apparatus 1 to an external apparatus. The communication unit 90 communicates with the external apparatus via the communication interface.

First Embodiment

Figure 3:
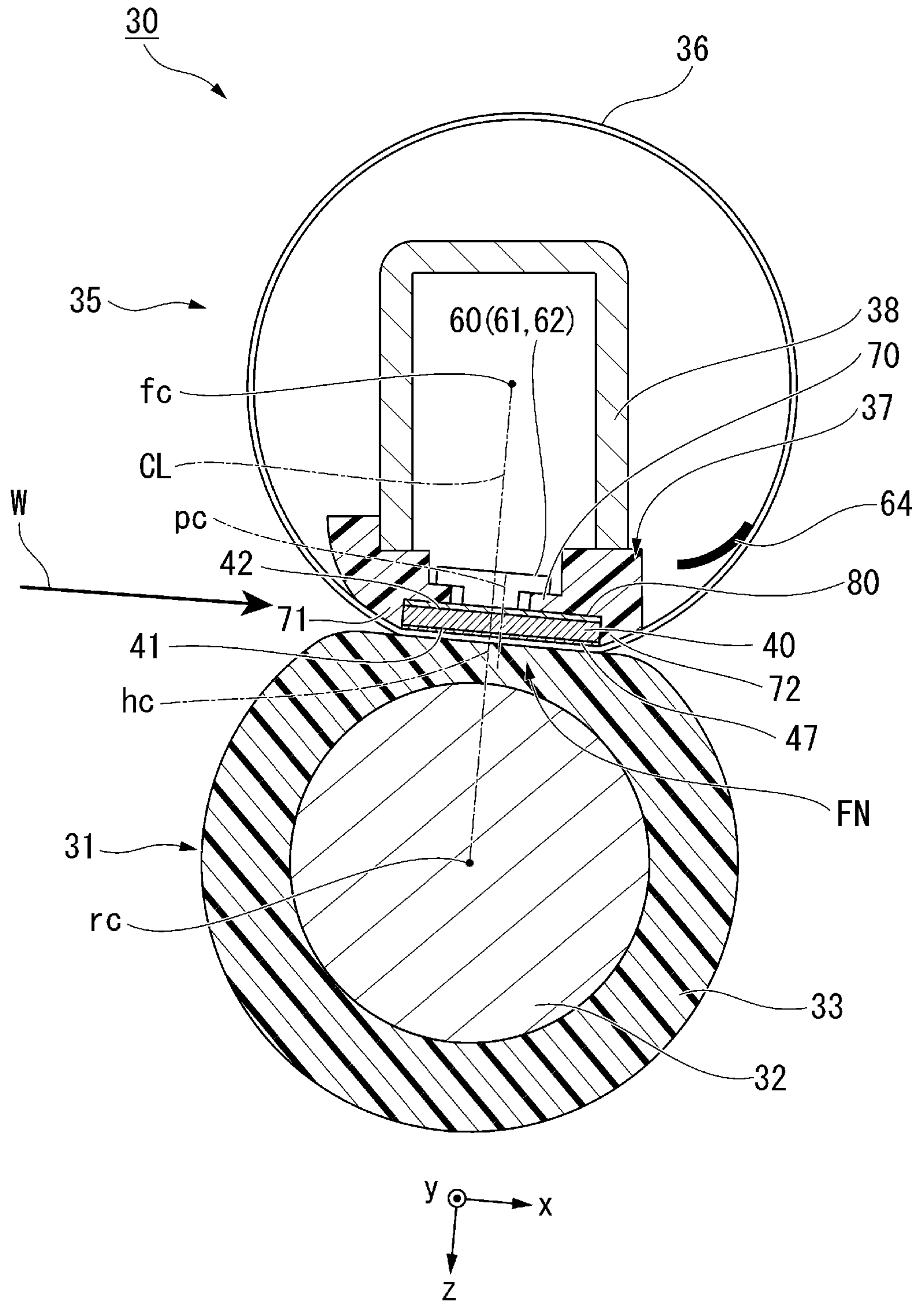
FIG. 3 is a cross-sectional view of a fixing device according to a first embodiment.

FIG. 3 is a cross-sectional view illustrating the fixing device according to the first embodiment.

As illustrated in FIG. 3, the fixing device 30 includes a pressurization roller 31 and a film unit 35. A fixing nip FN is formed between the pressurization roller 31 and the film unit 35. The pressurization roller 31 presses against the toner image on the sheets S passing through the fixing nip FN. The pressurization roller 31 rotates to convey the sheet S through the fixing nip FN. The film unit 35 heats the toner image on the sheets S passing through the fixing nip FN.

In the present specification, certain z, x, and y directions are defined as follows. The z direction is the direction in which the pressurization roller 31 and the film unit 35 are lined up. The +z direction is a direction going from the film unit 35 towards the pressurization roller 31. The x direction is a conveyance direction of the sheet S through the fixing nip FN and the +x direction is a downstream side along the conveyance direction for the sheet S. The y direction is a direction perpendicular to the z and x directions and corresponds to an axial direction of the pressurization roller 31.

The pressurization roller 31 includes a core 32, an elastic layer 33, and a release layer.

The core 32 is formed of a metal material such as stainless steel in a cylindrical shape. Both ends of the core 32 in the axial direction are supported rotatably. The core 32 is driven to rotate by a motor. The core 32 comes into contact with a cam member. The cam member can be rotated to cause the core 32 to approach or separate from the film unit 35.

The elastic layer 33 is formed of an elastic material such as silicone rubber. The elastic layer 33 is formed on the outer circumference surface of the core 32.

The release layer is formed of a resin material such as tetrafluoroethylene-perfluoroalkyl vinyl ether copolymer (PFA). The release layer is formed as a thin film on the outer circumference surface of the elastic layer 33.

Hardness of the outer circumference surface of the pressurization roller 31 is preferably in the range of 40° to 70° of a load of 9.8 N with an ASKER-C hardness meter. With such a hardness, an appropriate area (size) of the fixing nip FN and appropriate durability of the pressurization roller 31 can be provided.

The pressurization roller 31 can be moved towards and separated from the film unit 35 by rotation of the cam member. When the pressurization roller 31 is near the film unit 35 a pressurization spring presses the pressurization roller 31 against the film unit 31, and the fixing nip FN is formed. On the other hand, when a sheet S jams in the fixing device 30, the sheet S can be more easily removed by separating the pressurization roller 31 from the film unit 35. In an operating state (mode) such as a sleep state (mode) in which rotation of a cylindrical body 36 is stopped, the pressurization roller 31 can be released from (moved away from) the film unit 35 to prevent deformation of the cylindrical body 36.

The pressurization roller 31 is rotatably driven by a motor. If the pressurization roller 31 rotates while the fixing nip FN is formed, the cylindrical body 36 of the film unit 35 will follow the rotation of the pressurization roller 31. That is, the cylindrical body 36 rotates in response to the rotation of the pressurization roller 31 when the fixing nip FN is formed. When a sheet S is disposed in the fixing nip FN, the rotation of the pressurization roller acts to convey the sheet S along a conveyance direction W.

The film unit 35 includes the cylindrical body 36, a heater unit 40, a heat transfer member 80, a support member 37, a stay 38, a thermosensitive element 60, and a film thermometer 64.

The cylindrical body 36 is also called a fixing belt. The cylindrical body 36 is a cylindrical film that extends axially in the y direction. The cylindrical body 36 includes a base layer, an elastic layer, and a release layer formed in this order from the inner circumference side. The base layer is formed of a material such as polyimide in a cylindrical shape. The elastic layer is stacked on the outer circumference surface of the base layer. The elastic layer is formed of an elastic material such as silicone rubber. The release layer is stacked on the outer circumference surface of the elastic layer. The release layer is formed of a material such as a PFA resin.

The heater unit 40 is inside the cylindrical body 36. The heater unit 40 is formed in a rectangular plate shape in which the y direction is as the longitudinal direction and the x direction is as the transverse (width) direction. In the x and y directions, a direction approaching the center of the heater unit 40 is referred to as an inner side and a direction going away from the center of the heater unit 40 is referred to as an outer side in some cases. The heater unit 40 includes a first surface 41 on the +z direction side and a second surface 42 on a side opposite the first surface 41. The first surface 41 of the heater unit 40 heats the cylindrical body 36. The first surface 41 comes into contact with the inner surface of the cylindrical body 36 via a grease 47.

Figure 4:
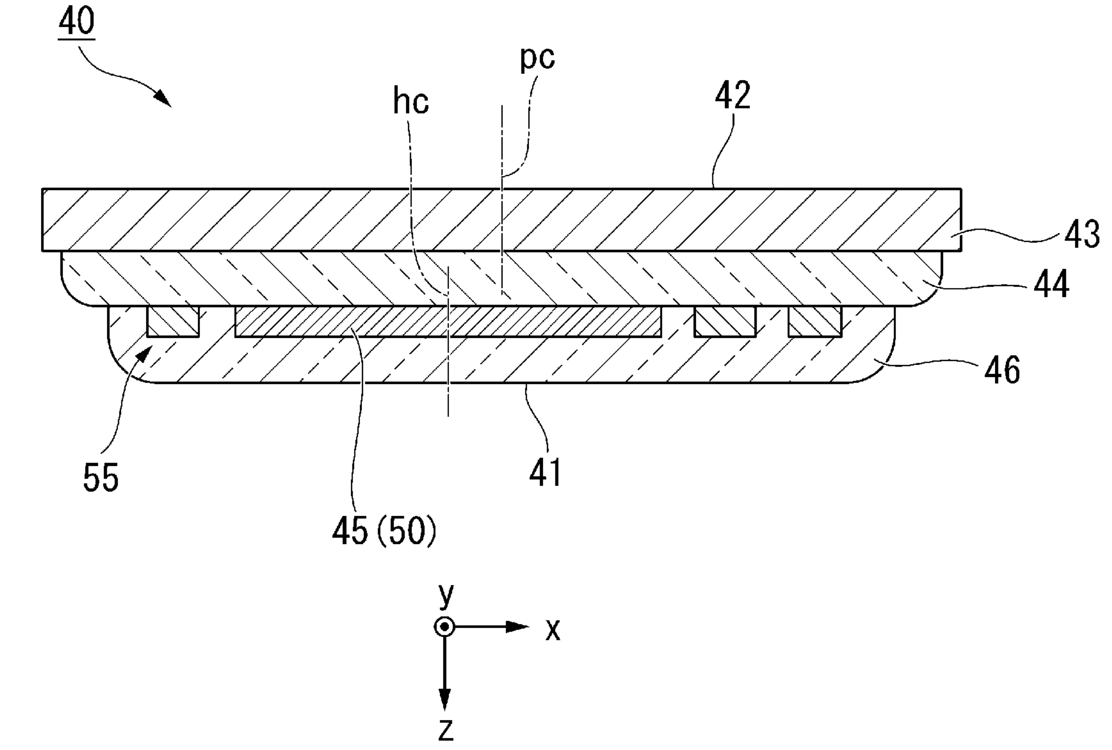
FIG. 4 is a cross-sectional view of a heater unit taken along line IV-IV of FIG. 5.
Figure 5:
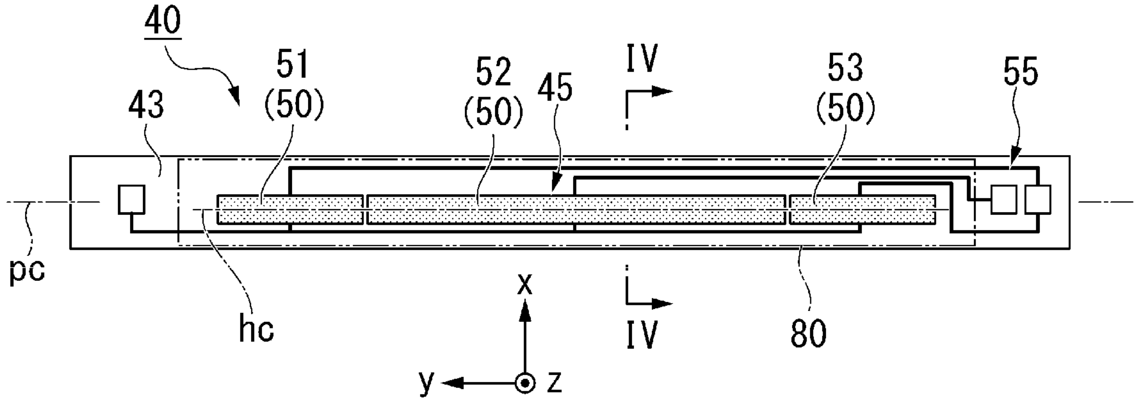
FIG. 5 is a bottom view of a heater unit.

FIG. 4 is a cross-sectional view illustrating the heater unit taken along the line IV-IV of FIG. 5. FIG. 5 is a bottom view (a diagram viewed from the +z direction) illustrating the heater unit 40 according to the first embodiment.

As illustrated in FIGS. 4 and 5, the heater unit 40 includes a substrate 43, a heating element group 45, and a wiring group 55.

The substrate 43 can be formed of a metal material such as stainless steel, a ceramic material such as aluminum nitride, or other materials. The substrate 43 has a rectangular plate shape. An insulation layer 44 is formed of a glass material or the like on the +z direction surface of the substrate 43. The −z direction surface of the substrate 43 is the second surface 42 of the heater unit 40. The second surface 42 of the heater unit 40 is formed in a planar shape perpendicular to the z direction.

As illustrated in FIG. 5, the heating element group 45 is disposed on the substrate 43. The heating element group 45 includes in this example a plurality of heating bodies 50. Each heating body 50 can be formed on the substrate 43 by disposing a material such as a silver-palladium alloy by screen printing on the substrate 43. The entire external shape of the heating element group 45 is formed in a rectangular shape. Both y direction ends of the heating element group 45 are at a position along the y-direction that is inside the outer edges of the portion of the pressurization roller 31 that comes into contact with the cylindrical body 36. The center (midpoint) of the heating element group 45 along the y direction is aligned with centerline width of the sheet S passing through the fixing device 30. A center hc (midpoint) of the heating element group 45 along the x direction is offset in the −x direction from the center pc (midpoint) of the substrate 43 along the x direction.

The heating element group 45 includes a plurality of heating bodies 50. The plurality of heating bodies 50 includes a first end heating body 51, a middle heating body 52, and a second end heating body 53 lined up in the y direction. The middle heating body 52 is disposed in the middle of the heating element group 45 along the y direction. In some examples, the middle heating body 52 may comprise a combination of multiple smaller heating bodies lined up along the y direction. The first end heating body 51 is disposed on the +y direction side of the middle heating body 52 at the end of the heating element group 45 in the +y direction. The second end heating body 53 is disposed on the −y direction side of the middle heating body 52 at the end of the heating element group 45 in the −y direction. The length of the middle heating body 52 in the y direction is larger than the minimum width of the sheets S passing through the fixing device 30. The length of the middle heating body 52 in the y direction is smaller than the maximum width of the sheets S passing through the fixing device 30. The length of the heating element group 45 in the y direction is larger than the maximum width of the sheets S passing through the fixing device 30. The length of the heating element group 45 in the y direction is a distance between an outer edge of the first end heating body 51 on the +y direction side and an outer edge of the second end heating body 53 on the −y direction side.

A wiring of the wiring group 55 is connected to each heating body 50. The heating element group 45 generates heat when energized via the wiring group 55. A sheet S that has a small width in the y direction passes through the middle portion of the fixing device 30. In this case, the control unit 6 causes just the middle heating body 52 to generate heat. On the other hand, the control unit 6 can cause all the heating bodies 50 to generate heat if the width of the sheet S is large.

As illustrated in FIG. 4, the heating element group 45 and the wiring group 55 are formed on the +z direction surface of the insulation layer 44. A protective layer 46 is formed of a glass material or the like to cover the heating element group 45 and the wiring group 55. The protective layer 46 forms the first surface 41 of the heater unit 40. When the heater unit 40 generates heat, viscosity of the grease 47 between the protective layer 46 and the cylindrical body 36 decreases. Therefore, sliding of the heater unit 40 and the cylindrical body 36 is improved.

The insulation layer 44 formed on the +z direction side of the substrate 43 may be additionally formed on −z direction side of the substrate 43. The protective layer 46 formed on the +z direction side of the substrate 43 may be additionally formed on the −z direction side of the substrate 43. By such arrangements, bending/warping of the substrate 43 is inhibited.

As illustrated in FIG. 3, a straight line CL connecting a center rc of the pressurization roller 31 to a center fc of the film unit 35 is defined. The center pc of the substrate 43 in the x direction is offset in the +x direction from the straight line CL. The center hc of the heating element group 45 in the x direction is located on the straight line CL. The entire heating element group 45 is contained within the area of the fixing nip FN and is disposed at the center of the fixing nip FN. Thus, a heat distribution of the fixing nip FN becomes more uniform, and thus a sheet S passing through the fixing nip FN will be uniformly heated.

The heat transfer member 80 overlaps with the heater unit 40. The heat transfer member 80 comes into contact with at least a part of the second surface 42 of the heater unit 40. The heat transfer member 80 serves to average variations in the temperature distribution of the heater unit 40. The heat transfer member 80 has a rectangular plate shape corresponding to the external shape of the substrate 43 of the heater unit 40.

The support member 37 is formed of a resin material such as a liquid crystal polymer. The support member 37 has a length in the y direction. The support member 37 covers both sides of the heater unit 40 in the x direction and is on the −z direction side of portions of the heater unit 40. The support member 37 holds the heater unit 40 via the heat transfer member 80. Both x direction ends of the support member 37 are chamfered. The support member 37 supports the inner circumference surface of the cylindrical body 36 on both x direction sides of the heater unit 40.

The support member 37 includes a base portion 70, an upstream wall portion 71, and a downstream wall portion 72. The base portion 70 supports the heater unit 40 on the side of the second surface 42. The upstream wall portion 71 protrudes from the end of the base portion 70 in the −x direction toward the pressurization roller 31. The downstream wall portion 72 protrudes from the end of the base portion 70 in the +x direction toward the pressurization roller 31. The heater unit 40 is disposed between the upstream wall portion 71 and the downstream wall portion 72.

The stay 38 is formed of a steel plate material or the like. The stay 38 has a length in the y direction. A cross section of the stay 38 perpendicular to the y direction has a U shape. The stay 38 is mounted on the −z direction side of the support member 37 with the opening of the U shape facing the base portion 70 of the support member 37. Both y direction ends of the stay 38 in the are fixed to the housing 10 of the image forming apparatus 1 or the like. Thus, the film unit 35 is structurally supported in the image forming apparatus 1. The stay 38 improves rigidity of the film unit 35 and thus limits bending and flexing of the film unit 35.

The thermosensitive element 60 is disposed in the −z direction from the heater unit 40. The thermosensitive element 60 comes into contact with the −z direction surface of the heat transfer member 80. The thermosensitive element 60 is disposed inside a hole that penetrates through the base portion 70 of the support member 37 in the z direction. A wiring of the thermosensitive element 60 is extends from the hole of the support member 37 in the −z direction. The thermosensitive element 60 in this example is a heater thermometer 61 and a thermostat 62. For example, the heater thermometer 61 is a thermistor.

Figure 6:
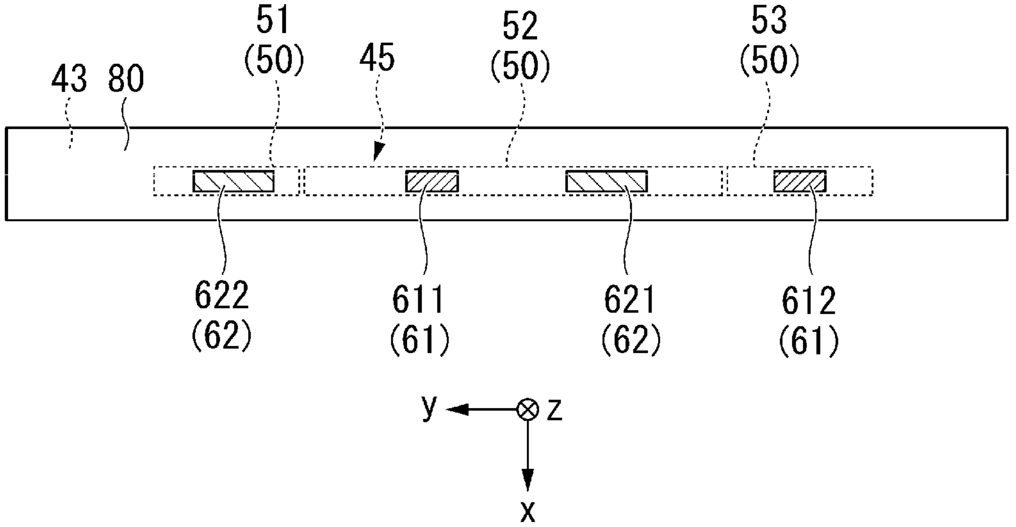
FIG. 6 is a plan view illustrating positions of a heater thermometer and a thermostat.

FIG. 6 is a plan view (diagram viewed in the −z direction) illustrating positions of a heater thermometer 61 and a thermostat 62 according to the first embodiment. In FIG. 6, the support member 37 is not illustrated so that other aspects may be explained.

As illustrated in FIG. 6, the heater thermometer 61 includes a middle heater thermometer 611 and an end heater thermometer 612. The thermostat 62 includes a middle thermostat 621 and an end thermostat 622. The middle heater thermometer 611 and the middle thermostat 621 are disposed in the −z direction of the middle heating body 52. The end heater thermometer 612 and the end thermostat 622 are disposed in the −z direction of the first end heating body 51 and the second end heating body 53.

The heater thermometer 61 detects a temperature of the heater unit 40 via the heat transfer member 80. The control unit 6 (see FIG. 1) measures a temperature of the heating element group using the heater thermometer 61 when the fixing device 30 starts. If the temperature of the heating element group 45 is lower than a predetermined temperature, the control unit 6 causes the heating element group 45 to generate heat for a short time before starting rotation of the pressurization roller 31. The heat generated by the heating element group 45 at this startup time serves to decrease the viscosity of the grease 47 coated on the inner circumference surface of the cylindrical body 36. Thus, friction between the heater unit 40 and the cylindrical body 36 is improved for when the rotation of the pressurization roller 31 starts.

The heater thermometer 61 detects a temperature of the heat transfer member 80.

The control unit 6 measures the temperature of the heat transfer member 80 using the heater thermometer 61 while the fixing device 30 is running. The control unit 6 controls energization of the heating element group 45 based on a temperature measurement result of the heat transfer member 80. Thus, a temperature of the heat transfer member 80 in contact with the support member 37 is kept at a temperature less than a heat resistance temperature (e.g., maximum permissible temperature) of the support member 37.

The thermostat 62 cuts off the energization of the heating element group 45 if the temperature of the heater unit 40 detected via the heat transfer member 80 exceeds a predetermined temperature. As a result, excessive heating of the cylindrical body 36 by the heater unit 40 is avoided.

As illustrated in FIG. 3, the film thermometer 64 comes into contact with an inner circumference surface of a part of the cylindrical body 36. A plurality of film thermometers 64 may be lined up at intervals along the y direction. Each such film thermometer 64 detects a temperature of a different portion in the cylindrical body 36 in the y direction.

The control unit 6 measures a temperature for each portion of the cylindrical body 36 arranged along the y direction using a film thermometer 64 when the fixing device 30 is running. The control unit 6 controls the energization of the heating element group 45 based on a temperature measurement result for each portion of the cylindrical body 36.

Figure 7:
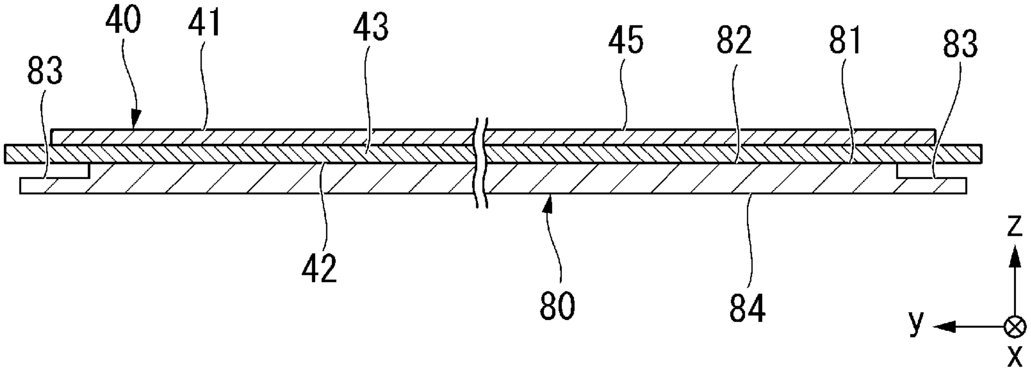
FIG. 7 is a cross-sectional view of a heater unit and a heat transfer member.
Figure 8:
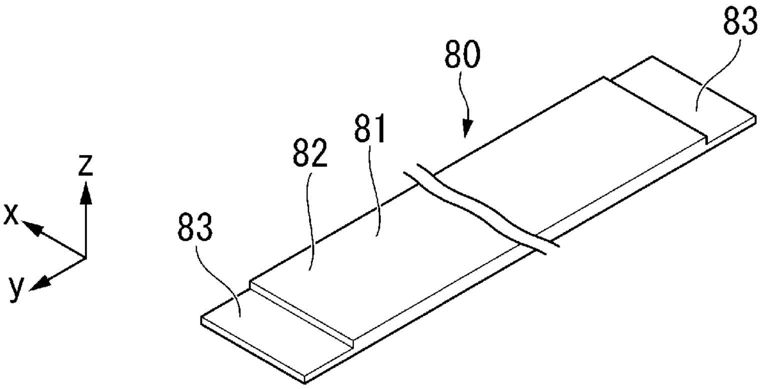
FIG. 8 is a perspective view of a heat transfer member.

FIG. 7 is a diagram illustrating an yz cross section of the heater unit 40 and the heat transfer member 80 according to the first embodiment. FIG. 8 is a perspective view illustrating the heat transfer member 80 according to the first embodiment.

As illustrated in FIGS. 7 and 8, the heat transfer member 80 has an overall thin plate shape. The heat transfer member 80 is formed of a material that has heat conductivity higher than that of the substrate 43. The heat transfer member 80 is formed of a metal material such as copper or aluminum that has a relatively high heat conductivity. A thickness direction of the heat transfer member 80 is in the z direction. The heat transfer member 80 has a rectangular shape in which the y direction is the longitudinal direction and the x direction the transverse (width) direction. The heat transfer member 80 comes into contact with the second surface 42 of the heater unit 40. The heat transfer member 80 overlaps with all the heating bodies 50 when seen in a plan view from the z direction. The heat transfer member 80 overlaps with the entire heating element group 45 in the plan view. The center of the heat transfer member 80 in the y direction is aligned with the center of the heating element group 45 in the y direction. Both y direction ends of the heat transfer member 80 extend beyond the y direction ends of the heating element group 45 in the y direction. The length of the heat transfer member 80 in the y direction is equal to or greater than the maximum width of a sheet S passing through the fixing device 30. Both y direction ends of the heat transfer member 80 extend beyond the y direction ends of the portions of the pressurization roller 31 that come into contact with the cylindrical body 36.

The heat transfer member 80 is a single component. The heat transfer member 80 includes a heater facing surface 81 facing the heater unit 40 and an opposite surface 84 facing away from the heater facing surface 81. The heat transfer member 80, in some examples, may be configured as a plurality of components that are thermally continuous with one another.

The center of the heater facing surface 81 in the y direction is aligned with the center of the heating element group 45 in the y direction. The heater facing surface 81 includes a contact portion 82 that is formed in a middle portion and comes into contact with the second surface 42 of the heater unit 40 and a pair of ends 83 that are adjacent to the contact portion 82 in the y direction.

The contact portion 82 is a planar surface oriented in the x and y directions. The contact portion 82 comes into contact with the heater unit 40 across the entire dimensions in the x and y directions. The contact portion 82 is formed in a rectangular shape in a plan view. The center of the contact portion 82 in the y direction is aligned with the center of the heater facing surface 81 in the y direction. Both y direction ends of the contact portion 82 in the are positioned inside of y direction ends of the heating element group 45. The length of the contact portion 82 in the y direction is equal to or greater than the maximum width of a sheet S passing through the fixing device 30.

Each end 83 is a planar surface oriented in the x and y directions. Each end 83 is connected to an edge of the contact portion 82 at a stepped surface facing outwards in the y direction. No portion of the ends 83 is in contact with the second surface 42 of the heater unit 40. In some examples, the contact area between each end 83 and the heater unit 40 per unit length in the y direction is less than a contact area between the contact portion 82 and the heater unit 40 per unit length in the y direction. In the present embodiment, since each end 83 is entirely separated from the heater unit 40, the contact area between each end 83 and the heater unit 40 per unit length in the y direction is equal to zero.

The opposite surface 84 is a planar surface in the x and y directions. Both y direction ends of the opposite surface 84 are outside the outer edges of the contact portion 82 of the heater facing surface 81. The opposite surface 84 faces the base portion 70 of the support member 37. The opposite surface 84 may come into direct contact with the base portion 70 or another member may be interposed between the opposite surface 84 and the base portion 70.

Operations of the fixing device 30 and the image forming apparatus 1 according to an embodiment will be described.

When the heating element group 45 is caused to generate heat for heating of the cylindrical body 36, a temperature distribution will be generated in the heater unit 40. In particular, since the temperature of the heater unit 40 is generally higher than that of the heat transfer member 80 in an early heating stage, heat is released from the heater unit 40 into the heat transfer member 80, and thus irregularity in the temperature distribution easily occurs in heater unit 40.

In the present embodiment, the heater facing surface 81 of the heat transfer member 80 includes the contact portion 82 and the ends 83. Both y direction ends of the contact portion 82 are positioned to be inside of the y direction ends of the heating element group 45 in the y direction. The contact area between the end 83 and the heater unit 40 per unit length in the y direction is less than the contact area between the contact portion 82 and the heater unit 40 per unit length in the y direction.

With this configuration, the contact portion 82 can be provided so that positions corresponding to both y direction ends of the heating element group 45 are avoided. Transfer of the heat to the heat transfer member 80 from the y direction ends (at which heat is particularly easily released) of the heating element group can be inhibited. Accordingly, it is possible to prevent the temperature of portions corresponding to the ends of the heating element group 45 from being lower than the temperature of the middle portion of the heating element group 45.

Further, since the ends 83 are adjacent to the contact portion 82 on the heater facing surface 81, the opposite surface 84 can be expanded in size in the y direction, compared to a configuration in which the entire length of the heat transfer member 80 in the y direction simply matches the length of the contact portion 82 in the y direction. Thus, the heat moving from the contact portion 82 to the opposite surface 84 in the heat transfer member 80 can diffuse in the y direction. Accordingly, it is possible to limit an increase in the temperature of the opposite surface 84 of the heat transfer member 80 and it is possible to prevent damage to the heat transfer member 80 that might otherwise be caused by an increase in the temperature of the support member 37.

The ends 83 of the heater facing surface 81 are not in contact with the heater unit 40. In this configuration, compared to a configuration in which the ends of the heater facing surface come into contact with the heater unit, it is possible to more effectively inhibit the transfer of the heat from the y direction ends of the heating element group 45 to the heat transfer member in the early heating stage of the heater unit 40.

Incidentally, if a sheet S passes through the fixing device 30 after the start of the heating of the heater unit 40, heat transfers from the heater unit 40 to the sheet S. When heat transfers from the heater unit 40 to the sheet S, the temperature can decrease in the middle portion of the heater unit 40 corresponding to the passage range (e.g., the corresponding width dimension of sheet S as it passes through the fixing nip FN. If the heating element group 45 is caused to generate heat in order to limit or prevent the decrease in the temperature of the middle portion, the temperature at the ends of the heating element group 45 outside of the passage range of the sheet S may increase.

In the present embodiment, since the length of the contact portion 82 in the y direction is equal to or greater than the maximum width of the sheet S, the heat from the ends of the heating element group 45 can be efficiently transferred away. Accordingly, it is possible to average the temperature distribution of the heater unit 40 in the fixing device 30 after a sheet S passes.

Furthermore, in the present embodiment, both y direction ends of the opposite surface 84 extend in the y direction beyond the y direction ends of the contact portion 82, thus the heat at the ends of the contact portion 82 can diffuse to outward in the y direction toward the opposite surface 84. Accordingly, it is possible to limit a local increase in the temperature of the opposite surface 84 of the heat transfer member 80 and it is possible to prevent damage to the heat transfer member 80 that might otherwise be caused by an increase in the temperature of the support member 37.

Both ends of the heat transfer member 80 in the y direction extend to the outside of the y direction ends of the heating element group 45. With this configuration, the opposite surface 84 is formed to be longer in the y direction than the heating element group 45. Therefore, if sheets S continuously pass through the fixing device 30, an increase in the temperature of a portion of the heat transfer member 80 out of the passage range of the sheet S in the y direction can be inhibited. Accordingly, it is possible to inhibit damage caused due to an increase in the temperature of the support member 37.

The heat transfer member 80 has heat conductivity higher than that of the substrate 43 of the heater unit 40. With this configuration, the heat transfer member 80 can transfer heat more quickly than the substrate 43. Accordingly, it is possible to efficiently average (uniformize) the temperature distribution of the heater unit 40.

If the heat transfer member 80 is configured as a plurality of components and then one or more junction portion will be formed between the contact portion 82 of the heater facing surface 81 and the opposite surface 84. Movement of heat in a junction portion is likely to be worse than the through the components. In the present embodiment, the heat transfer member 80 is a single member extending from the contact portion 82 of the heater facing surface 81 to the opposite surface 84. With this configuration, as compared to a case with a junction portion, heat can more efficiently transfer from the contact portion 82 of the heater facing surface 81 to the opposite surface 84 in the heat transfer member 80. Accordingly, it is possible to efficiently diffuse the heat using the entire thickness direction of the heat transfer member 80.

Second Embodiment

Figure 9:
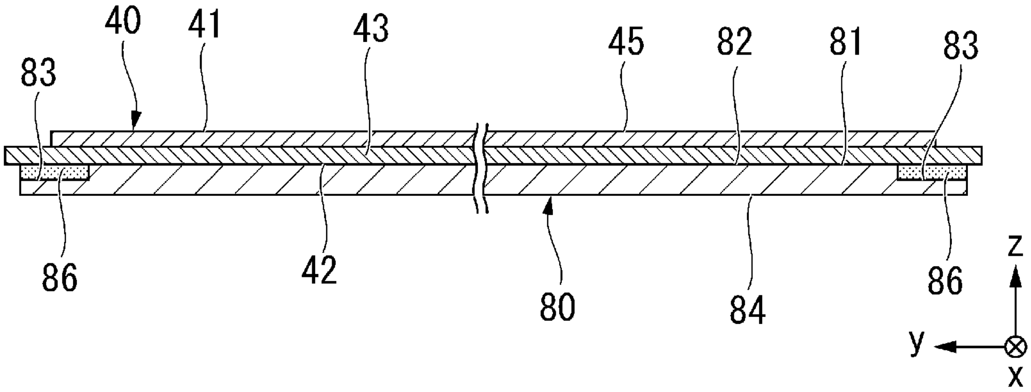
FIG. 9 is a cross-sectional view of a heater unit, a heat transfer member, and a heat insulation member according to a second embodiment.
Figure 10:
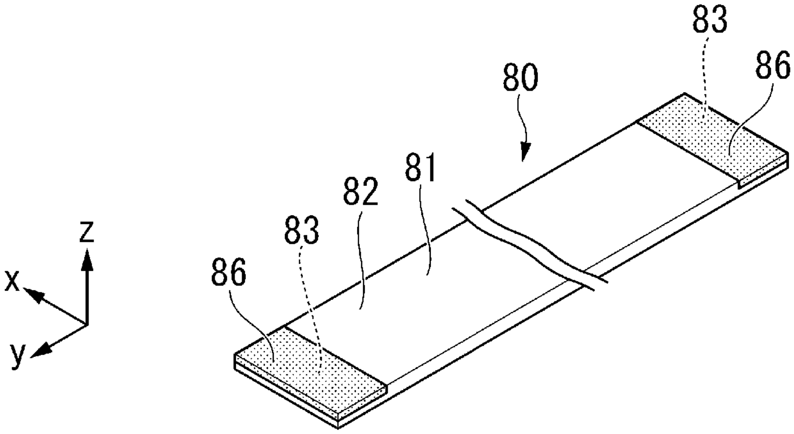
FIG. 10 is a perspective view of a heat transfer member and a heat insulation member.

The film unit 35 according to a second embodiment will be described with reference to FIGS. 9 and 10. FIG. 9 is a view illustrating the yz cross section of a heater unit 40, a heat transfer member 80, and a heat insulation member 86 according to the second embodiment. FIG. 10 is a perspective view illustrating the heat transfer member 80 and the heat insulation member(s) 86 according to the second embodiment.

The second embodiment differs from the first embodiment in that heat insulation members 86 at between the ends 83 and the second surface 42 of the heater unit 40. The heat insulation members 86 are disposed outside of the contact portion 82. The heat insulation members 86 come into contact with the ends 83 and the second surface 42 of the heater unit 40 to help regulate mutual approach (that is spacing between these different elements). The heat insulation members 86 are formed of a material that has heat conductivity lower than that of the heat transfer member 80 overall. For example, the heat insulation member 86 can be formed of a resin, a felt, or the like. A resin forming the heat insulation member 86 may be the same as the resin forming the support member 37 in some examples. The shape of the heat insulation member 86 matches the shape of the corresponding end 83 of the heater facing surface 81 in a plan view. However, in some examples, the shape of the heat insulation member 86 need not match the shape of the end 83 in a plan view. For example, the heat insulation member 86 may be smaller in size (area) than the end 83 in a plan view.

In the second embodiment, advantages similar to those of the first embodiment can also be obtained. In addition, with the second embodiment the heat insulation members 86 can prevent the heater unit 40 from being pressed by the pressurization roller 31 and bent towards the end 83 of the heater facing surface 81. Accordingly, it is possible to more reliably form the fixing nip FN within a desired range in the y direction.

Third Embodiment

Figure 11:
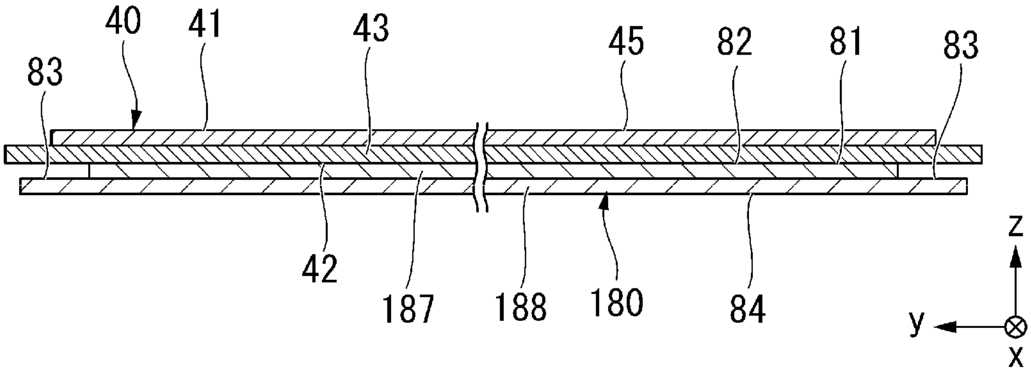
FIG. 11 is a cross-sectional view of a heater unit, a heat transfer member, and a heat insulation member according to a third embodiment.

A heat transfer member 180 according to a third embodiment will be described with reference to FIG. 11. FIG. 11 is a diagram illustrating the yz cross section of a heater unit 40 and a heat transfer member 180 according to the third embodiment.

In the first embodiment, the heat transfer member 80 is a single (unitary) component. However, the third embodiment differs from the first embodiment in that the heat transfer member 180 is formed by a plurality of components. The heat transfer member 180 is formed by overlapping a first plate 187 and a second plate 188 with each other. The first plate 187 and the second plate 188 are each formed of a metal material that has relatively high heat conductivity such as copper or aluminum. In some examples, the first plate 187 and the second plate 188 may be graphite sheets, or the like.

The first plate 187 is located between the second plate 188 and the heater unit 40. The first plate 187 is formed in a rectangular shape. The first plate 187 provides the contact portion 82 of the heater facing surface 81. The second plate 188 overlaps with the first plate 187 on the side opposite to the heater unit 40. The second plate 188 is formed in a rectangular shape. The second plate 188 has the same width as that of the first plate 187 in the x direction. Both y direction ends of the second plate 188 extend in the y direction beyond the y direction ends of the first plate 187. The external shape of the second plate 188 matches the overall external shape of the heat transfer member 180 in a plan view. The second plate 188 provides the opposite surface 84 of the heat transfer member 180. The second plate 188 includes the ends 83 of the heater facing surface 81 outside of the first plate 187. The second plate 188 may be bonded to the first plate 187. In some examples, a grease or the like that has excellent heat conductivity may be disposed between the first plate 187 and the second plate 188.

In the third embodiment, advantages similar to those of the first embodiment can be obtained. In addition to these advantages, in the third embodiment, the contact portion 82 and the ends 83 can be formed on the heater facing surface 81 by simply overlapping the first plate 187 and the second plate 188 with each other. Therefore, it is possible to easily manufacture the heat transfer member 180.

The heat insulation member 86 according to the second embodiment may be combined with the heat transfer member 180 according to the third embodiment. In this configuration, the heat insulation member 86 can help regulate bending of the ends of the heat transfer member 180 toward the heater unit 40. Accordingly, it is possible to maintain the heat transfer member 180 in a desired shape. This configuration may be particularly effective if the first plate 187 and the second plate 188 are formed of a flexible graphite sheet or the like.

Fourth Embodiment

Figure 12:
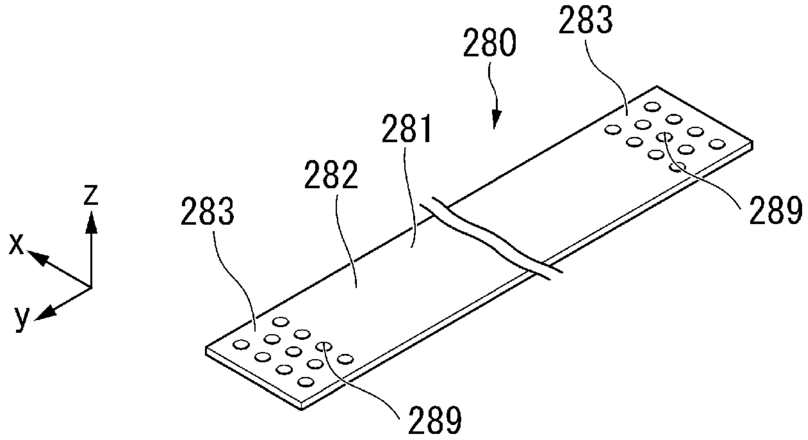
FIG. 12 is a perspective view of a heat transfer member according to a fourth embodiment.

A heat transfer member 280 according to a fourth embodiment will be described with reference to FIG. 12. FIG. 12 is a perspective view illustrating a heat transfer member 280 according to the fourth embodiment.

In the first embodiment, the no portion of the ends 83 of the heater facing surface 81 of the heat transfer member 80 are in contact with the heater unit 40. However, the fourth embodiment differs from the first embodiment in that ends 283 of the heater facing surface 281 include recessed portions 289 to limit contact with the heater unit 40.

In the ends 283 of the heater facing surface 281 of the heat transfer member 280, the recessed portions 289 are formed. The recessed portion 289 may have a bottom surface or may be a through hole in the heat transfer member 280. The ends 283 include the recessed portions 289, and thus a contact area between the heater unit 40 to the second surface 42 is reduced from what would otherwise be the case without the presence of the recessed portions 289. As a result, the contact area between ends 283 and the heater unit 40 per unit length in the y direction is less than the contact area between the contact portion 282 and the heater unit 40 per unit length in the y direction.

In the fourth embodiment, advantages similar to those of the first embodiment can be obtained. In addition to these advantages, in the fourth embodiment, since the ends 283 of the heater facing surface 281 actually come into contact with the heater unit 40, it is possible to prevent the heater unit 40 from being pressed by the pressurization roller 31 and bent towards the heat transfer member 280. Accordingly, it is possible to more reliably form the fixing nip FN within a desired range in the y direction.

Fifth Embodiment

Figure 13:
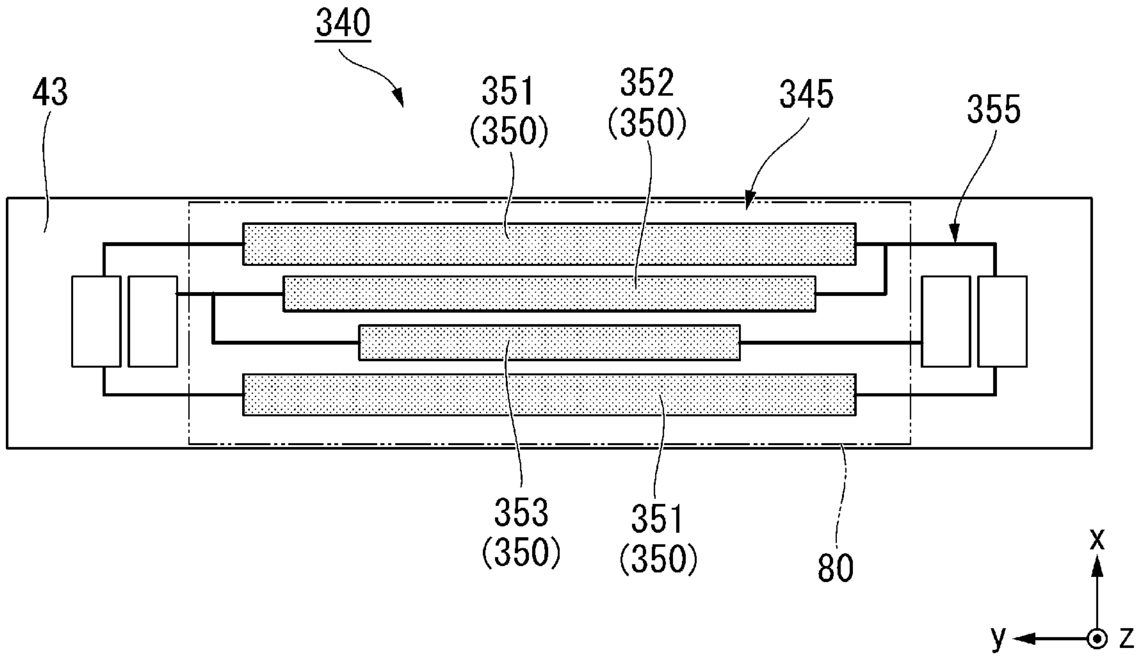
FIG. 13 is a bottom view of a heater unit according to a fifth embodiment.

A heater unit 340 according to a fifth embodiment will be described with reference to FIG. 13. FIG. 13 is a bottom view illustrating a heater unit 340 according to the fifth embodiment.

The fifth embodiment differs from the first embodiment in the disposition of heating bodies 350 (heating elements) of the heater unit 340. The heater unit 340 includes a substrate 43, a heating element group 345, and a wiring group 355.

The heating element group 345 is disposed on the substrate 43. The entire external shape of the heating element group 345 is a rectangular shape in which the y direction is defined as its longitudinal direction and the x direction is defined as its transverse direction.

The heating element group 345 includes a plurality of heating bodies 350. The plurality of heating bodies 350 include a pair of first heating bodies 351, a second heating body 352, and a third heating body 353. The heating bodies 350 are disposed in the order of one first heating body 351, the second heating body 352, the third heating body 353, and the other first heating body 351 along the x direction. Each heating body 350 has a length corresponding to a sheet width. The second heating body 352 is shorter than the first heating bodies 351 in the y direction. The third heating body 353 is shorter than the second heating body 352 in the y direction. A wiring of the wiring group 355 is connected to each heating body 350. The heating element group 345 generates heat when energized (electrified) via the wiring group 355. The control unit 6 causes the appropriate heating bodies 350 to generate heat in accordance with the width of the passing sheet S.

In the fifth embodiment, as in the other embodiments, the heat transfer members 80, 180, and 280 may overlap with the heater unit 340. In this case, both y direction ends of the contact portion 82 of the heater facing surface 81 are disposed to be inside of the ends of the heating element group 345 in the y direction, and thus advantages similar to those of the foregoing embodiments can be obtained.

Sixth Embodiment

Figure 14:
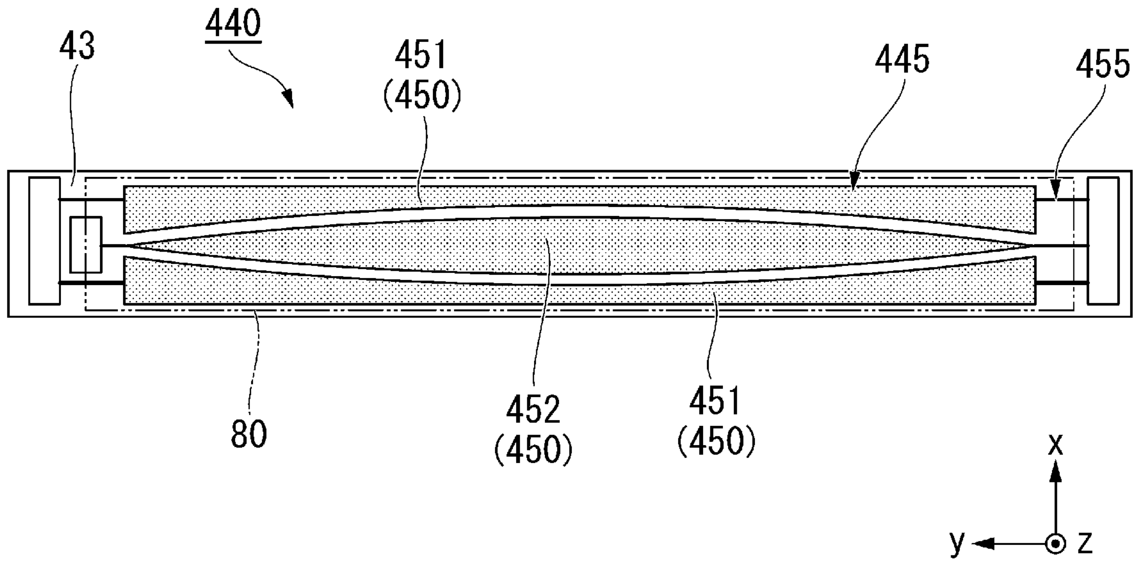
FIG. 14 is a bottom view of a heater unit according to a sixth embodiment.

A heater unit 440 according to a sixth embodiment will be described with reference to FIG. 14. FIG. 14 is a bottom view illustrating a heater unit 440 according to the sixth embodiment.

The sixth embodiment differs from the first embodiment in disposition of heating bodies 450 of the heater unit 440. The heater unit 440 includes a substrate 43, a heating element group 445, and a wiring group 455.

The wiring group 455 is disposed on the substrate 43. The overall external shape of the heating element group 445 is a rectangular shape.

The heating element group 445 includes a plurality of heating bodies 450. The plurality of heating bodies 450 include a pair of first heating bodies 451 and a second heating body 452. The plurality of heating bodies 450 are disposed in the order of one first heating body 451, the second heating body 452, and the other first heating body 451 along the x direction. The first heating body 451 has a shape that becomes thinner in the middle than at the ends. The y direction ends of the pair of first heating bodies 451 in are located at substantially the same positions. The second heating body 452 has a shape that becomes thicker in the middle than the ends. The ends of the second heating body 452 are located at substantially the same positions as the ends of each first heating body 451.

A wiring of the wiring group 455 is connected to each heating body 450. The heating element group 445 generates heat by energization (electrification) via the wiring group 455. The control unit 6 causes the corresponding heating bodies 450 to generate heat in accordance with the width of the passing sheet S. If only the first heating body 451 is caused to generate heat, the amount of generated heat in the heating element group 445 decreases from the middle towards the ends in the y direction. On the other hand, if the pair of first heating bodies 451 and second heating body 452 are all caused to generate heat simultaneously, the amount of generated heat in the heating element group 445 can be more uniform across the entire length in the y direction as compared to a case where only the first heating body 451 generates heat. Accordingly, the control unit 6 electrifies only the first heating bodies 451 when a sheet S that has a small width passes. The control unit 6 electrifies a first heating body 451 and the second heating body 452 if a sheet S that has a large width passes.

In the sixth embodiment, as in the foregoing embodiments, the heat transfer members 80, 180, and 280 may overlap with the heater unit 440. In this case, both y direction ends of the contact portion 82 of the heater facing surface 81 are positioned inside of the y direction ends of the heating element group, and thus advantages similar to those of the other embodiments can be obtained.

In the foregoing embodiments, the first surface 41 of the heater unit 40 comes into contact with the inner surface of the cylindrical body 36. However, in other examples, another member (a heat sink member) may be interposed between the first surface of the heater unit 40 and the inner circumference surface of the cylindrical body 36.

According to an embodiment, both ends of the contact portion of the heat transfer member in the longitudinal direction are positioned inside of the ends of the heating element group along the longitudinal direction. Both ends of the opposite surface of the heat transfer member are positioned outside of the contact portion. Thus, it is possible to prevent the temperature of the portions corresponding to the ends of the heating element group in the heater unit from being lower than that of the portion corresponding to the middle portion of the heating element group, and it is possible to limit an increase in the temperature of the opposite surface of the heat transfer member. Thus, it is possible to avoid damage to the heat transfer member that might otherwise be caused by an increase in a temperature of the support member disposed on the side opposite to the heater unit.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A fixing device, comprising:

a cylindrical fixing body;

a heater unit in an interior region surrounded by the cylindrical fixing body and including a heating element group, the heater unit extending lengthwise in a first direction parallel to an axial direction of the cylindrical fixing;

a heat transfer member having a contact surface that contacts heater unit and an opposite surface on a side opposite the heater unit; and an insulation member having a thermal conductivity lower than the heat transfer member, the insulation member being on an end portion of the heat transfer member and adjacent to the contact surface in the first direction, wherein the outer edges of the opposite surface in the first direction are at positions along the first direction that are beyond the outer edges of the contact surface in the first direction, and the insulation member is between the heat transfer member and the heater unit in a second direction orthogonal to the opposite surface.

2. The fixing device according to claim 1, wherein end portions of the heat transfer member in the first direction do not contact the heater unit.

3. The fixing device according to claim 1, wherein the insulation member is a resin material.

4. The fixing device according to claim 1, wherein the ends of the heat transfer member in the first direction extend in the first direction beyond the ends of the heating element group.

5. The fixing device according to claim 1, wherein the heater unit comprises a substrate on which the heater element group is formed, and the heat transfer member has thermal conductivity higher than that of the substrate.

6. The fixing device according to claim 1, wherein the heat transfer member is a single, unitary component.

7. The fixing device according to claim 1, wherein the heat transfer member comprises:

a first plate which includes the contact surface, and a second plate which includes the opposite surface.

8. The fixing device according to claim 1, wherein the insulation member is a felt material.

9. An image forming apparatus, comprising:

a sheet conveyance path along which a sheet travels in a printing operation;

a press roller on the sheet conveyance path; and a fixing device according to claim 1 on the sheet conveyance path and configured to abut against the press roller to form a fixing nip through which the sheet travels in the printing operation.

10. A fixing device, comprising:

a cylindrical body;

a heater in an interior region surrounded by the cylindrical body, the heater including a plurality of heating elements, the heater extending in a first direction parallel to an axial direction of the cylindrical body; and a heat transfer member including a heater facing side which faces the heater and an opposite surface side facing in the opposite direction from the heater facing side, wherein the heater facing side includes:

a contact surface portion which comes into contact with the heater, and a pair of end portions, the contact surface portion being between the pair of end portions in the first direction, the outermost edges of the pair of end portions are at positions along the first direction that are inside positions of the outermost ends of the plurality of heating elements in the first direction, a contact area between the heater and the pair of end portions per unit length in the first direction is less than a contact area between the heater and the contact surface portion per unit length in the first direction, and the pair of end portions have recessed parts formed therein, the recessed parts extending into the heat transfer member in a second direction orthogonal to the opposite surface.

11. The fixing device according to claim 10, wherein the recessed parts are through-holes.

12. The fixing device according to claim 10, wherein the outermost ends of the heat transfer member in the first direction extend in the first direction beyond in the outermost ends of the heater.

13. The fixing device according to claim 10, wherein the heat transfer member is a single, unitary component.

14. The fixing device according to claim 10, wherein the heat transfer member comprises:

a first plate which includes the contact surface portion, and a second plate which includes the opposite surface side.

15. An image forming apparatus, comprising:

a sheet conveyance path along which a sheet travels in a printing operation;

a press roller on the sheet conveyance path; and a fixing device according to claim 11 on the sheet conveyance path and configured to abut against the press roller to form a fixing nip through which the sheet travels in the printing operation.

16. An image forming apparatus, comprising:

a sheet conveyance path along which a sheet travels in a printing operation;

a press roller on the sheet conveyance path;

a fixing device on the sheet conveyance path and configured to abut against the press roller to form a fixing nip through which the sheet travels in the printing operation, the fixing device including:

a cylindrical fixing body;

a heater unit in an interior region surrounded by the cylindrical fixing body and including a heating element group, the heater unit extending lengthwise in a first direction parallel to an axial direction of the cylindrical fixing; and a heat transfer member having a contact surface that contacts heater unit and an opposite surface on a side opposite the heater unit, wherein the outer edges of the opposite surface in the first direction are at positions along the first direction that are beyond the outer edges of the contact surface in the first direction, the heat transfer member further includes a pair of end portions with recessed parts formed therein, the recessed parts extending into the heat transfer member in a second direction orthogonal to the opposite surface, and the contact surface is between the pair of end portions in the first direction.

17. The image forming apparatus according to claim 16, wherein the heat transfer member comprises:

a first plate which includes the contact surface, and a second plate which includes the opposite surface.

18. The image forming apparatus according to claim 16, wherein the heat transfer member is a single, unitary component.

* * * * *